US012651214B2

(12) United States Patent
Kim

(10) Patent No.: US 12,651,214 B2
(45) Date of Patent: Jun. 9, 2026

(54) METHOD AND APPARATUS FOR MANAGING RECEIPT OF PACKAGE USING VEHICLE AND COMPUTER-READABLE RECORDING MEDIUM FOR EXECUTING THE METHOD

(71) Applicants: Hyundai Motor Company, Seoul (KR); Kia Corporation, Seoul (KR)

(72) Inventor: Tae Ho Kim, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 19 days.

(21) Appl. No.: 18/768,979

(22) Filed: Jul. 10, 2024

(65) Prior Publication Data

US 2025/0061387 A1      Feb. 20, 2025

(30) Foreign Application Priority Data

Aug. 16, 2023      (KR) ........................ 10-2023-0106945

(51) Int. Cl.
*G06Q 10/04*      (2023.01)
*G06Q 10/08*      (2024.01)
*G07C 9/00*      (2020.01)

(52) U.S. Cl.
CPC ........... *G06Q 10/043* (2013.01); *G06Q 10/08* (2013.01); *G07C 9/00182* (2013.01)

(58) Field of Classification Search
CPC .. G06Q 10/043; G06Q 10/08; G06Q 10/0832; G06Q 10/083; G06Q 10/0633; G07C 9/00182; G07C 9/00896; G07C 9/38; G07C 2009/00388; G07C 2009/00753
See application file for complete search history.

(56) References Cited

U.S. PATENT DOCUMENTS

| | | | | |
|---|---|---|---|---|
| 11,953,902 | B2 * | 4/2024 | Ferguson ............... | G06N 3/045 |
| 2002/0046173 | A1 * | 4/2002 | Kelly ..................... | G06Q 10/08 |
| | | | | 705/50 |
| 2019/0050790 | A1 * | 2/2019 | Ferguson ............. | G05D 1/6445 |
| 2019/0057341 | A1 * | 2/2019 | Salter ................... | G05D 1/0088 |
| 2021/0295246 | A1 * | 9/2021 | Yamamoto ........... | G06Q 10/087 |

* cited by examiner

*Primary Examiner* — A. Hunter Wilder
(74) *Attorney, Agent, or Firm* — Fox Rothschild LLP

(57)      ABSTRACT

A method of managing receipt of a package using a vehicle includes: determining a size of the package when there is a request for delivery of the package, determining an optimal place to store the package in the vehicle using the determined size of the package and a size of a loading space in the vehicle, providing the optimal place to a recipient, and finally determining a package storage position provided by the recipient. A deliverer may store the package in the finally determined package storage position.

19 Claims, 9 Drawing Sheets

METHOD AND APPARATUS FOR MANAGING RECEIPT OF PACKAGE USING VEHICLE AND COMPUTER-READABLE RECORDING MEDIUM FOR EXECUTING THE METHOD

CROSS-REFERENCE TO RELATED APPLICATION(S)

This application claims under 35 U.S.C. § 119 (a) the benefit of Korean Patent Application No. 10-2023-0106945, filed on Aug. 16, 2023, the entire contents of which are incorporated by reference herein.

BACKGROUND

(a) Technical Field

The present disclosure relates to a method and apparatus for managing receipt of a package using a vehicle and a computer-readable recording medium for executing the method.

(b) Description of the Related Art

In certain newer residential buildings, e.g., buildings that may include apartments, condominiums, or multi-purpose complexes including commercial and residential facilities, unmanned package storage facilities are installed. Therefore, when a recipient of a package is not at home, a delivery person may conveniently store the package in an unmanned package storage facility, and may send a personal identification number to the recipient, thereby safely delivering the package to the recipient without loss of the package.

In particular, a recipient may receive a package in a non-face-to-face manner without anxiety of meeting a stranger.

However, alternatives to an unmanned package storage facility in existing or new buildings are being studied.

SUMMARY

The present disclosure is directed to a method and apparatus for managing receipt of a package using a vehicle and a computer-readable recording medium for executing the method that substantially obviate one or more problems due to limitations and disadvantages of the related art.

Embodiments provide a method and apparatus for managing receipt of a package using a vehicle and a computer-readable recording medium for executing the method, which may perform management so that a recipient safely receives a package regardless of the presence or absence of an unmanned package storage facility.

However, the objects to be accomplished by the embodiments are not limited to the above-mentioned objects, and other objects not mentioned herein will be clearly understood by those skilled in the art from the following description.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of managing receipt of a package using a vehicle may include determining, by a size determination controller, a size of the package when there is a request for delivery of the package; determining, by a place determination controller, an optimal place to store the package in the vehicle using the determined size of the package and a size of a loading space in the vehicle; and providing, by a display, the optimal place to a recipient, where a deliverer may store the package in a finally determined package storage position.

In an example, the determining a size may include collecting information related to the size of the package and analyzing the collected information to determine the size of the package.

In an example, the collected information may include at least one of information about the size of the package included in product information provided by a shopping mall, information about the size of the package provided by the deliverer, or information about the size of the package directly provided by the recipient.

In an example, the determining an optimal place may include receiving the size of the loading space varying depending on a type of the loading space, comparing the size of the loading space varying depending on a type of the loading space with the determined size of the package, and determining the optimal place using a result of the comparison.

In an example, the size of the loading space varying depending on a type of the loading space may be stored in advance or may be provided by the recipient.

In an example, the determining an optimal place may include acquiring information about weather around the vehicle, and the optimal place may be determined using both the result of the comparison and the information about the weather.

In an example, the information about the weather may be acquired from a sensor mounted to the vehicle or may be received from outside.

In an example, the method may further include storing the determined optimal place, selecting the stored optimal place, and providing the selected optimal place to the recipient.

In an example, the method may further include granting the deliverer authority to access the package storage position and removing the authority when access to the package storage position to store the package by the deliverer granted the authority is completed.

In an example, the granting authority may include sending a one-time digital key to the deliverer in response to a request of the recipient or when a condition set by the recipient is satisfied, and the deliverer may access the package storage position using the one-time digital key.

In an example, the removing the authority may include determining whether access to a space corresponding to the package storage position using the one-time digital key has been completed and ending use of the one-time digital key upon determining that access to the space has been completed.

In an example, the loading space may include at least one of a frunk, a trunk, a first-row space, or a second-row space of the vehicle.

In an example, access to the space corresponding to the package storage position using the one-time digital key may include at least one of opening of a frunk of the vehicle, opening of a tailgate of the vehicle, opening of a first-row door of the vehicle, or opening of a second-row door of the vehicle.

A vehicle may be configured to carry out the method of managing receipt of the package.

In another aspect of the present disclosure, an apparatus for managing receipt of a package using a vehicle may include a size determination controller configured to determine a size of a package in response to a first control signal, a place determination controller configured to determine an optimal place to store the package in a vehicle using the determined size of the package and a size of a loading space in the vehicle, an display configured to provide the determined optimal place to a recipient in response to a second control signal, and a controller configured to generate the first control signal in response to a request for delivery of the package, wherein a deliverer may store the package in a finally determined package storage position.

In an example, the place determination controller may include a comparator configured to compare the size of the loading space varying depending on a type of the loading space with the determined size of the package and a place analyzer configured to determine the optimal place using a result of the comparison.

In an example, the apparatus may further include a storage configured to store the size of the loading space varying depending on a type of the loading space and the determined optimal place.

In an example, the controller may generate the second control signal in response to a request of the recipient.

In a further aspect of the present disclosure, a recording medium storing a program for executing a method of managing receipt of a package using a vehicle may store a program configured to implement a function of determining a size of a package when there is a request for delivery of the package, a function of determining an optimal place to store the package in a vehicle using the determined size of the package and a size of a loading space in the vehicle, and a function of providing the optimal place to a recipient and finally determining a package storage position provided by the recipient.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
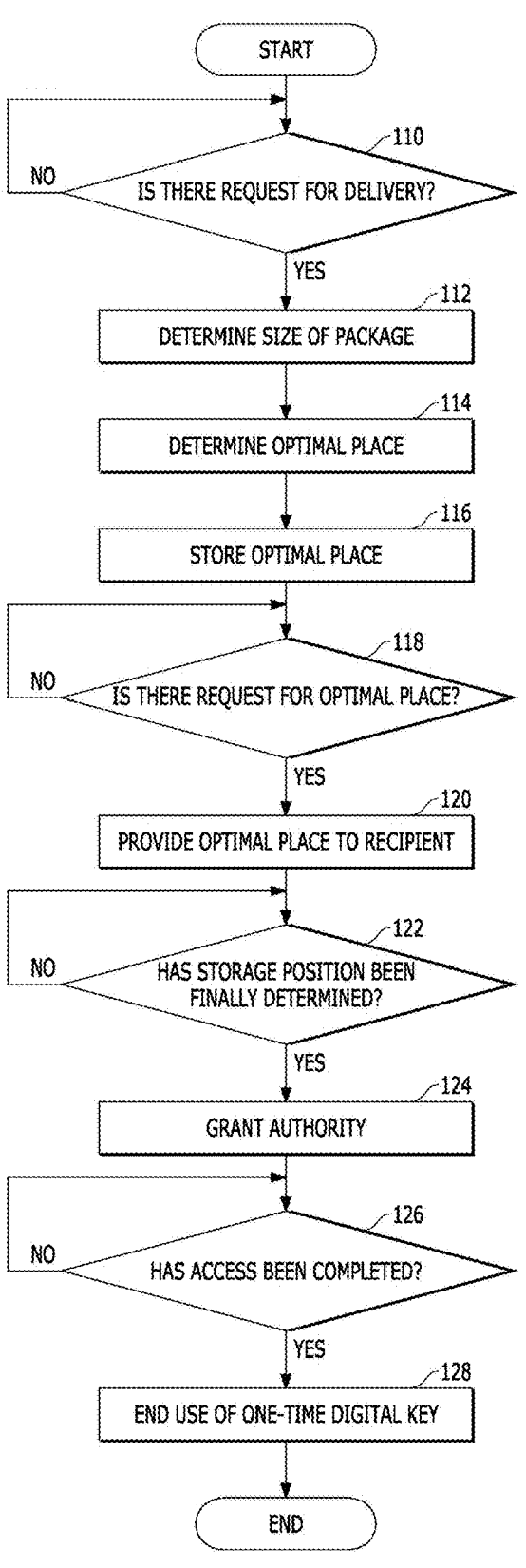
FIG. 1 is a flowchart for explaining a method of managing receipt of a package using a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a method and apparatus for managing receipt of a package using a vehicle according to embodiments will be described with reference to the accompanying drawings.

FIG. 1 is a flowchart for explaining a method 100 of managing receipt of a package using a vehicle (hereinafter referred to as a "method") according to an embodiment.

Figure 2:
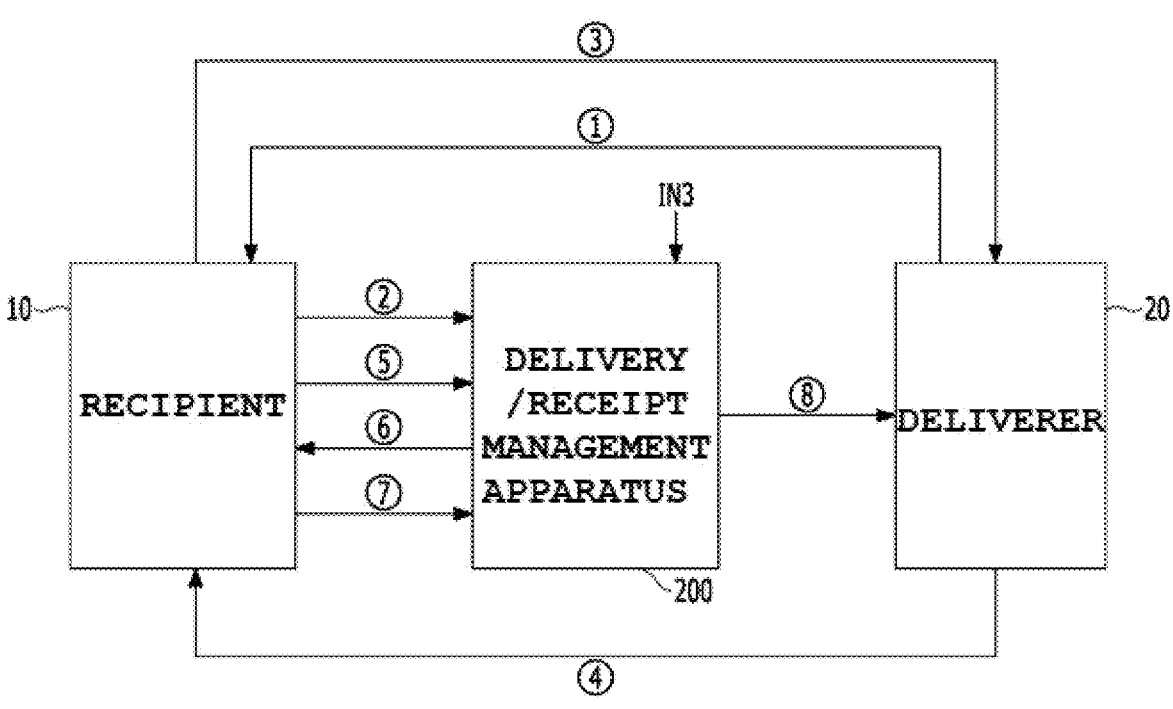
FIG. 2 is a process diagram for helping understanding of the method shown in FIG. 1.

FIG. 2 is a process diagram for helping understanding of the method 100 shown in FIG. 1.

Figure 3:
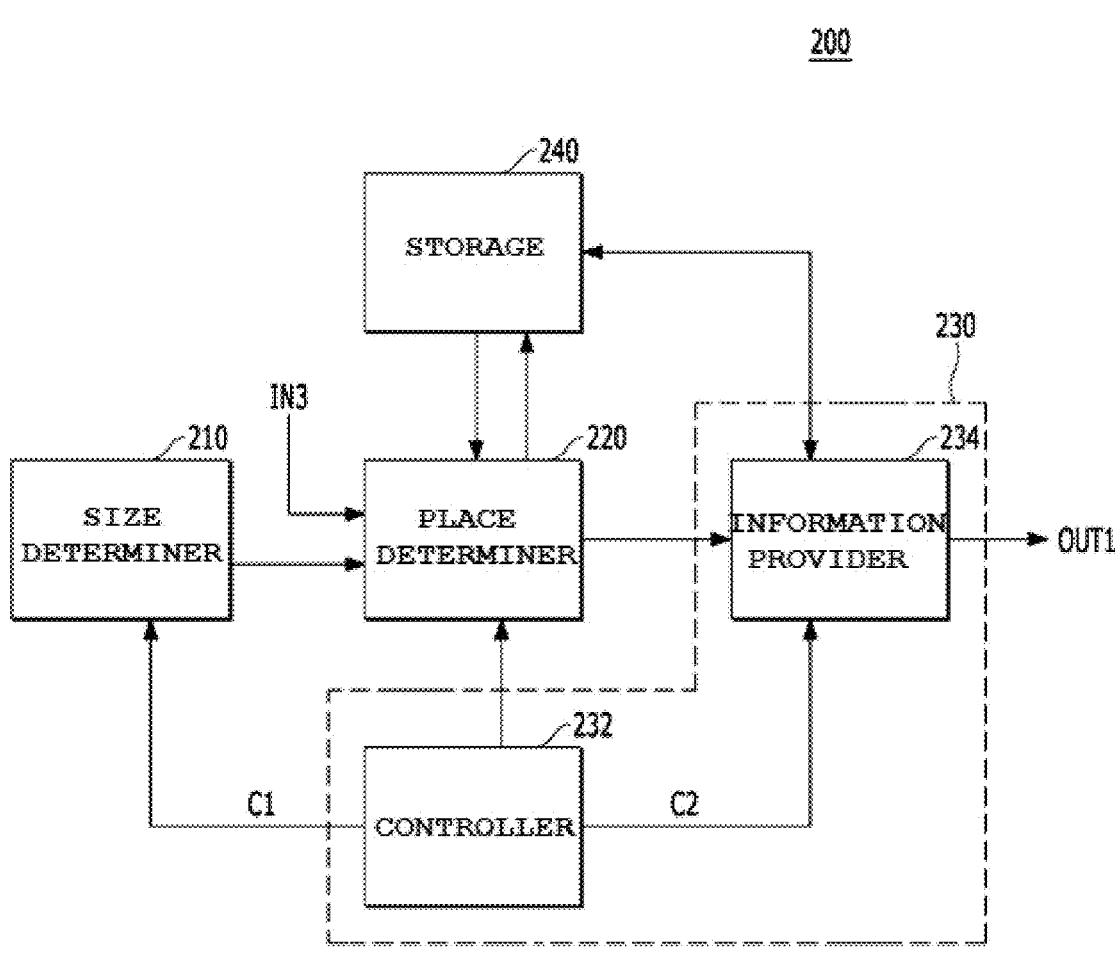
FIG. 3 is a block diagram of an apparatus for managing receipt of a package using a vehicle according to an embodiment.

FIG. 3 is a block diagram of an apparatus 200 for managing receipt of a package using a vehicle (hereinafter referred to as an "apparatus") according to an embodiment.

The method 100 shown in FIG. 1 may be performed by the apparatus 200 shown in FIG. 3, but the embodiments are not limited thereto. That is, according to another embodiment, the method 100 shown in FIG. 1 may be performed by an apparatus configured differently from the apparatus 200 shown in FIG. 3.

In addition, the apparatus 200 shown in FIG. 3 may perform the method 100 shown in FIG. 1, but the embodiments are not limited thereto. That is, according to another embodiment, the apparatus 200 shown in FIG. 3 may perform a method configured differently from the method 100 shown in FIG. 1.

Hereinafter, for better understanding, the method 100 shown in FIG. 1 will be described as being performed by the apparatus 200 shown in FIG. 3.

The apparatus 200 shown in FIG. 3 may include a size determination controller (or "size determiner") 210, a place determination controller (or "place determiner") 220, a user interface 230, and a storage 240.

First, when there is a request for delivery of a package, the size of the package is determined (steps 110 and 112).

A person 20 who delivers the package (hereinafter referred to as a "deliverer") requests a person 10 who wants to receive the package (hereinafter referred to as a "recipient") to receive the package. The request for receipt may be made using a wireless terminal (e.g., a mobile phone) of the deliverer. However, the embodiments are not limited to any specific means or method for requesting receipt.

After receiving such a request, the recipient 10 may activate the apparatus 200 in order to request delivery of the package.

The apparatus 200 determines whether the receipt of delivery is requested from the deliverer to the recipient 10, and is activated upon determining that delivery is requested (step 110).

Thereafter, the activated apparatus 200 determines the size of the package (e.g. the length, width, and height of the package) (step 112).

Steps 110 and 112 may be performed by the apparatus 200 as follows.

First, the user interface 230 may serve to interface with the recipient 10 and the deliverer 20, and may include a controller 232 and an information provider 234 (e.g., a display).

As provided herein, in addition to the controller 232, the size determiner 210 and the place determiner 220 may constitute modules and/or devices of the apparatus 200, and may constitute controllers. For example, the above units of the apparatus 200 may constitute hardware components that form part of a controller (e.g., modules or devices of a high-level controller), or may constitute individual controllers each having a processor and memory. The apparatus 200 may include one or more processors and memory.

For example, in order to perform step 110, the controller 232 of the user interface 230 determines whether the receipt of delivery has been requested from the deliverer 20 to the recipient 10, and generates a first control signal C1 in response to a result of the determination. A determination as to whether delivery has been requested may be made by the controller 232 when the recipient 10 requests activation of the apparatus 200.

Thereafter, in order to perform step 112, the size determiner 210 determines the size of the package in response to the first control signal C1, and outputs the determined size to the place determiner 220.

According to the embodiment, the size determiner 210 may collect information related to the size of the package, and may analyze the collected information to determine the size (the length, width, and height) of the package.

A subject that collects information may be the recipient 10, the deliverer 20, or the apparatus 200, but the embodiments are not limited to any specific information collecting subject. For example, the recipient 10 may collect information, and may provide the collected information to the size determiner 210 through the user interface 230.

The information collected in order to determine the size of the package may include various pieces of information. For example, the collected information may include at least one of first to third size information.

The first size information may be information related to the size of the package included in product information provided by a shopping mall, the second size information may be information related to the size of the package provided by the deliverer 20, for example, a picture or video, and the third size information may be information related to the size of the package known to the recipient 10.

For example, when the collected information is the second size information, the apparatus 200 may analyze the picture or video provided by the deliverer 20 to determine the size of the package.

According to an embodiment, the recipient 10 may provide at least one of the first to third size information to the apparatus 200 while activating the apparatus 200.

According to another embodiment, upon receiving a request for receipt of the package from the deliverer 20, the recipient 10 may request the first or second size information from the deliverer 20. In response thereto, the deliverer 20 may provide the first or second size information to the recipient 10, and the recipient 10 may provide the first or second size information to the apparatus 200.

Referring back to FIG. 1, after step 112, an optimal place to store the package in the vehicle may be determined using the determined size of the package and the size of the loading space in the vehicle (step 114).

Figure 4:
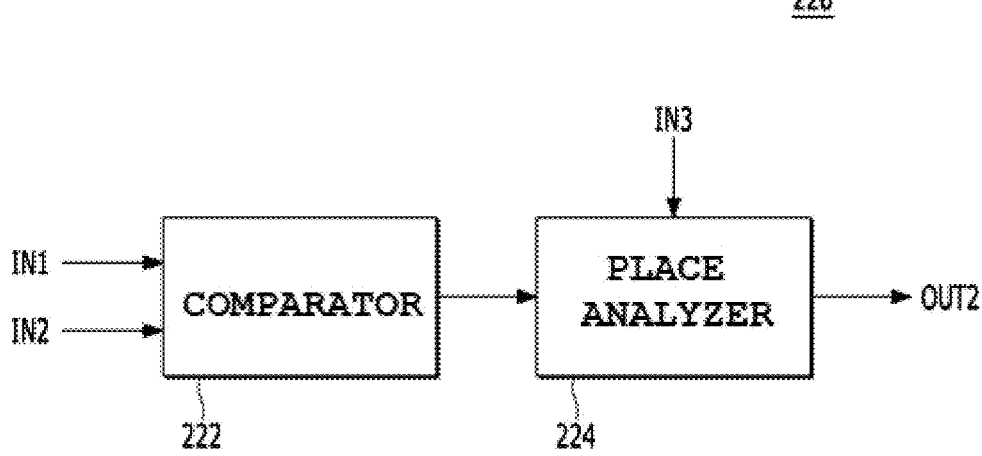
FIG. 4 is a block diagram of an embodiment of the place determiner shown in FIG. 3.

FIG. 4 is a block diagram of an embodiment of the place determiner 220 shown in FIG. 3.

The place determiner 220 shown in FIG. 4 may include a comparator 222 and a place analyzer 224.

Figure 5:
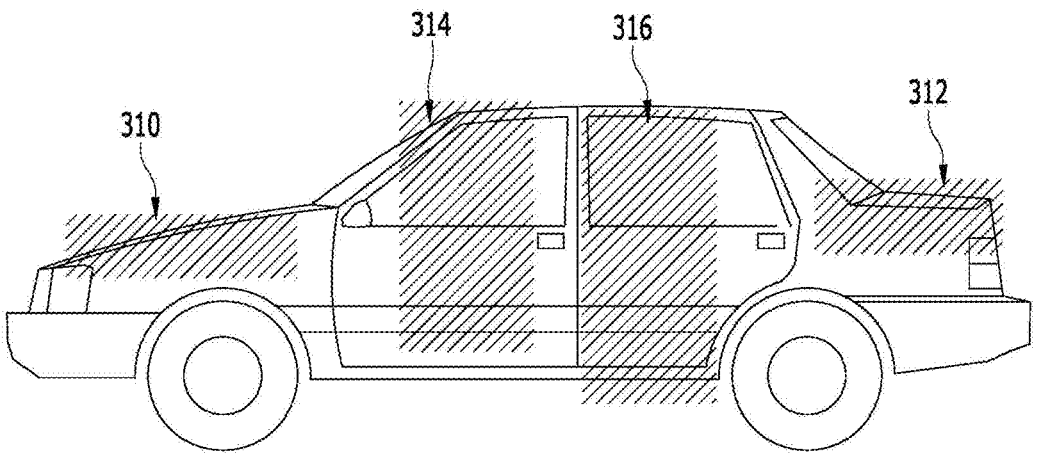
FIG. 5 is a view showing the external appearance of a vehicle capable of storing a package.

FIG. 5 is a view showing the external appearance of the vehicle capable of storing the package.

Referring to FIG. 5, the loading space in the vehicle may include at least one of a frunk (a portmanteau of front and trunk) 310, a trunk 312, a first-row space 314, or a second-row space 316.

For example, in order to perform step 114, the place determiner 220 may determine an optimal place to store the package in the vehicle using the size of the package determined by the size determiner 210 and the size of the loading space in the vehicle.

The comparator 222 compares the size of the loading space received through an input terminal IN1 with the determined size of the package received through an input terminal IN2, and outputs a result of the comparison to the place analyzer 224. In this case, the size of the loading space varies depending on the type thereof.

In this case, information on the size of the loading space that varies depending on the type thereof may be stored in advance or may be provided from the recipient 10. For example, the storage 240 may store in advance information on the size of the loading space that varies depending on the type thereof. That is, the storage 240 may store in advance information on the size (i.e. the length, width, and height) of the loading space in the vehicle, e.g. at least one of the frunk 310, the trunk 312, the first-row space 314, or the second-row space 316, and the place determiner 220 may extract the information on the size (i.e. the length, width, and height) of the loading space stored in the storage 240, may compare the same with the information on the size (i.e. the length, width, and height) of the package, and may determine an optimal place.

According to an embodiment, the place analyzer 224 may determine an optimal place using a result of the comparison by the comparator 222, and may output the determined place through an output terminal OUT2.

According to another embodiment, the place analyzer 224 may acquire information on the weather around the vehicle in order to determine an optimal place. Thereafter, the place analyzer 224 may determine an optimal place using both the result of the comparison by the comparator 222 and the weather information. To this end, the place analyzer 224 may directly receive the weather information through an input terminal IN3, or may receive the same via the user interface 230. The weather information may be provided from a sensor mounted to the vehicle (e.g. a raindrop detection sensor or an image sensor such as a camera), or may be provided from outside the vehicle. For example, the weather information may be provided from outside the vehicle through an Audio Video Navigation Telematics (AVNT) system.

After step 114, the determined optimal place may be stored (step 116). For example, in order to perform step 116, the optimal place determined by the place determiner 220 may be stored in the storage 240.

After step 116, the optimal place may be provided to the recipient 10, and a position provided by the recipient 10 may be finally determined to be a position at which the package is to be stored (hereinafter referred to as a "storage position") (steps 118 to 122).

According to an embodiment, a determination as to whether the optimal place is requested by the recipient 10 may be made (step 118). If the optimal place is requested by the recipient 10, the optimal place is provided to the recipient 10 (step 120).

In order to perform step 118, the controller 232 of the user interface 230 may determine whether the optimal place is requested by the recipient 10, and may generate a second control signal C2 in response to a result of the determination.

In order to perform step 120, the information provider 234 may read the optimal place from the storage 240 in response to the second control signal C2, and may provide the read optimal place to the recipient 10 through an output terminal OUT1.

According to another embodiment, even if the optimal place is not requested by the recipient 10, when the optimal place is determined by the place determiner 220 of the apparatus 200, the determined optimal place may be provided to the recipient 10. That is, when the optimal place is determined by the place determiner 220, the information provider 234 may provide the determined optimal place to the recipient 10 through the output terminal OUT1.

Thereafter, the recipient 10 finally determines a storage position in which the package is to be stored, i.e., received, taking into consideration the optimal place provided by the apparatus 200.

Thereafter, when the deliverer 20 stores the package in the finally determined storage position, the delivery of the package may be deemed complete.

A process for causing the deliverer 20 to store the package in the finally determined storage position will be described below.

After step 120, the apparatus 200 may determine whether the storage position has been finally determined (step 122). That is, when the recipient 10 finally determines the storage position and provides the same to the apparatus 200, the apparatus 200 may determine that the storage position has been finally determined.

When the storage position is finally determined, authority to access the storage position is granted to the deliverer 20 (step 124). For example, the authority may be directly provided from the apparatus 200 to the deliverer 20. Alternatively, unlike what is shown in the drawings, the authority may be provided to the deliverer 20 through the recipient 10. For example, the authority may be a "digital key" that enables access to the vehicle by opening the door of the vehicle.

Such authority may be provided to the deliverer 20 in response to the request of the recipient 10 or when a condition set by the recipient 10 is satisfied.

The authorized deliverer 20 may access the storage position in the vehicle using the authority.

Figure 6:
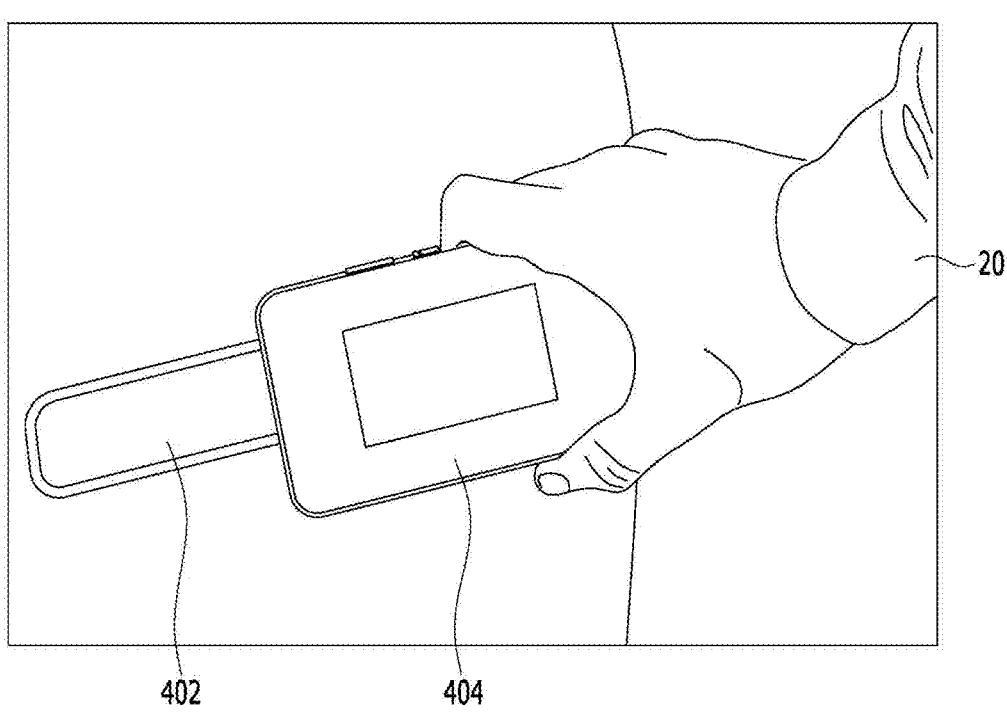
FIG. 6 is a view illustrating a state in which a deliverer accesses the vehicle using a digital key.

FIG. 6 is a view illustrating a state in which the deliverer 20 accesses the vehicle using the digital key.

The deliverer 20 may access the storage position using the digital key. In detail, when the digital key is sent to a mobile terminal 404 of the deliverer 20, the deliverer 20 may touch the mobile terminal 404 to a door handle 402 of the vehicle to open the door of the vehicle, and may access the storage position.

Figure 7A:
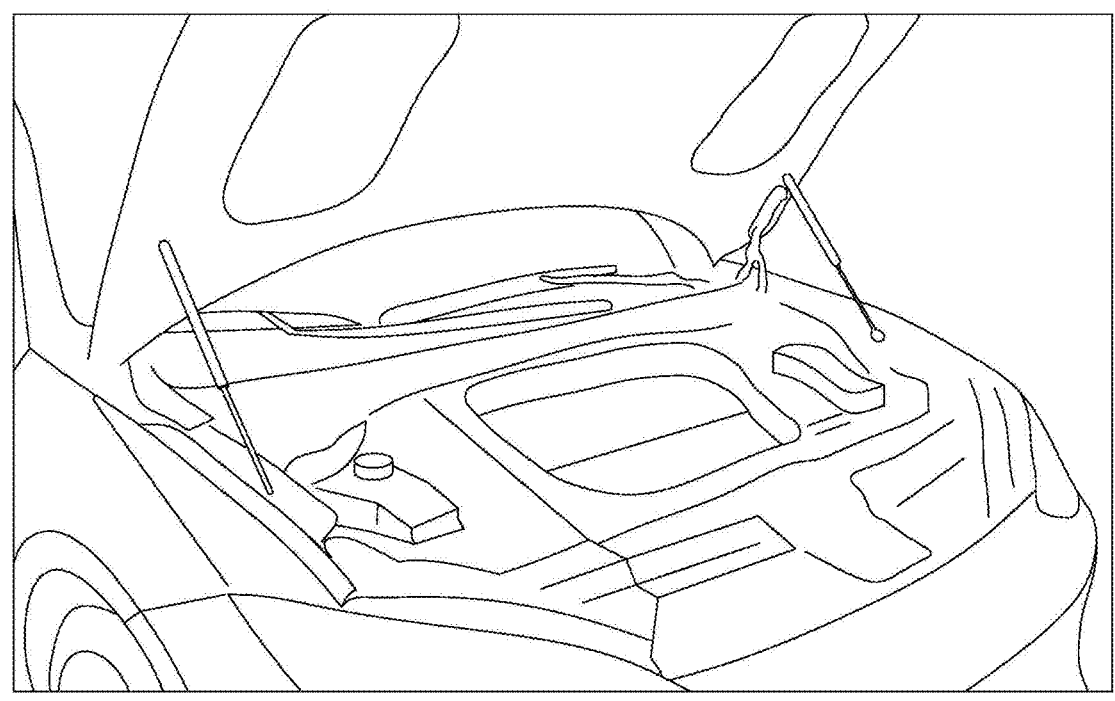
FIGS. 7A to 7C are views for explaining step 126.
Figure 7B:
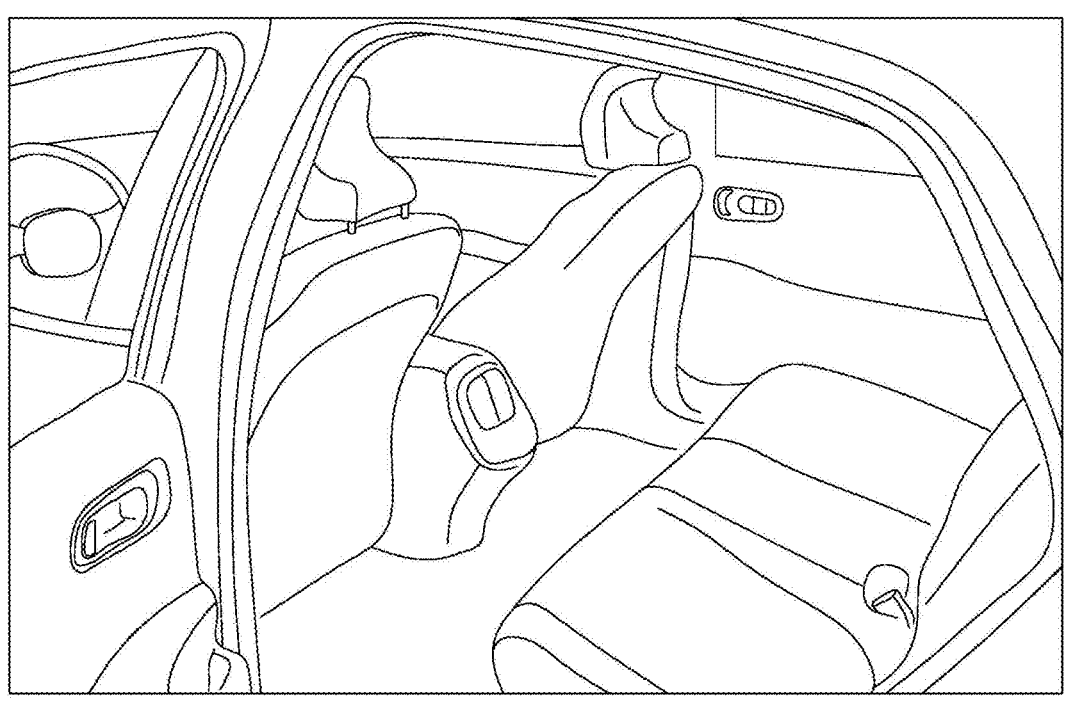
Figure 7C:
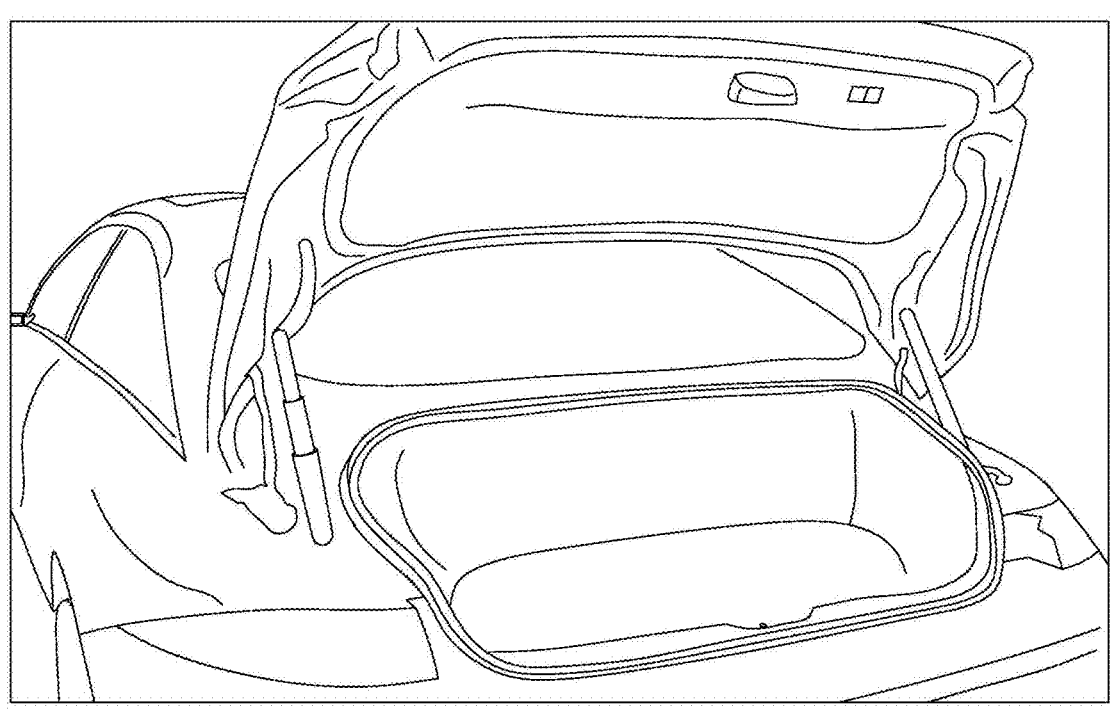

FIGS. 7A to 7C are views for explaining step 126.

For example, accessing a space corresponding to the storage position using the digital key entails opening of the frunk of the vehicle (refer to FIG. 7A), opening of the second-row door (refer to FIG. 7B), opening of the trunk (or tailgate) (refer to FIG. 7C), or opening of the first-row door of the vehicle (not shown).

In this case, according to the embodiment, the authentication of the deliverer 20 may be requested for security. That is, when the deliverer 20 attempts to access a corresponding space using the digital key, the vehicle may request authentication from the deliverer 20. In this case, the deliverer 20 may request an authentication password from the recipient 10, and the recipient 10 may send the authentication password to the deliverer 20. The deliverer 20 may access the corresponding space in the vehicle using the received authentication password.

After step 124, when access to the storage position for storage of the package by the authorized deliverer 20 is completed, the deliverer 20 is deprived of his/her authority (steps 126 and 128).

First, a determination is made as to whether access to the storage position for storage of the package by the authorized deliverer 20 has been completed (step 126).

In particular, a determination is made as to whether the deliverer 20 has closed the frunk, the first-row door, the second-row door, or the trunk (or tailgate) of the vehicle after loading the package in the space corresponding to the storage position using the digital key, i.e., accessing the vehicle.

When access to the open space is completed, the use of the digital key is ended (step 128). For example, when access is completed, information about the digital key stored in the mobile terminal 404 of the deliverer 20 may be deleted. In this way, the digital key may be disposable.

Steps 122 to 128 described above may also be performed by the user interface 230.

Meanwhile, the aforementioned apparatus 200 may correspond to a mobile terminal of the recipient 10. In this case, the method 100 shown in FIG. 1 may be performed as follows by an application installed in the mobile terminal of the recipient 10. In this case, the controller 232 and the size determiner 210 shown in FIG. 3 may correspond to a processor of the mobile terminal 200, the storage 240 may correspond to a memory of the mobile terminal 200, and the information provider 234 may correspond to a display window of the mobile terminal 200. In particular, the information provider 234 may be a display of the mobile terminal 200 or another communication device.

Figure 8:
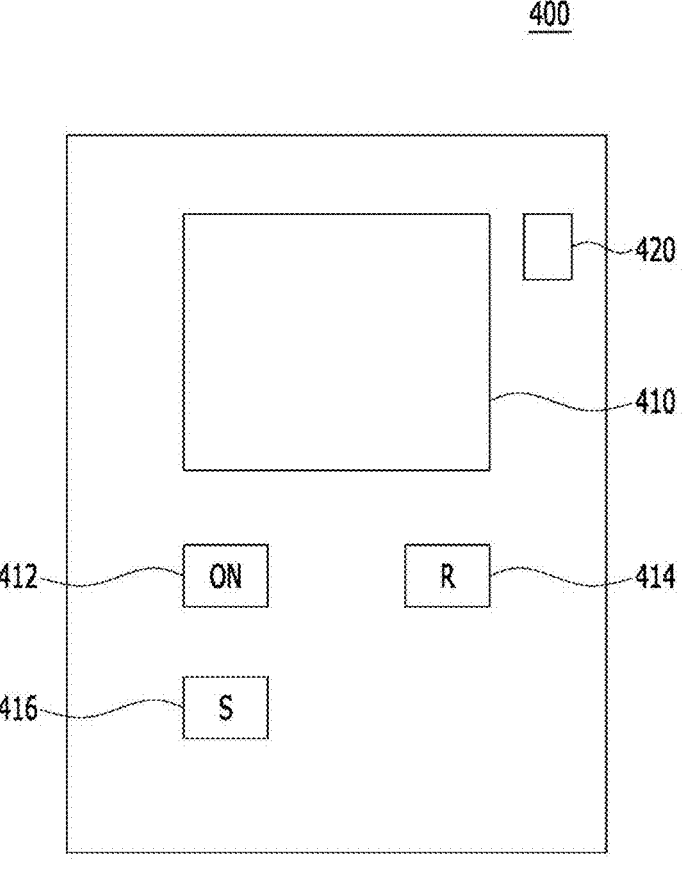
FIG. 8 is a diagram showing an example of a screen provided by an embodiment of an application installed in a mobile terminal of a recipient that performs the method shown in FIG. 1.

FIG. 8 is a diagram showing an example of a screen 400 provided by an embodiment of an application installed in the mobile terminal 200 of the recipient 10 that performs the method 100 shown in FIG. 1.

The screen 400 shown in FIG. 8 may include a display window 410, an activation key button (ON) 412, a reproduction button® 414, a selection button 416, and a speaker 420.

First, when the recipient 10 clicks on the activation key button 412, the mobile terminal 200 may recognize that there is a request for delivery (step 110), and may activate the application to perform steps 112 to 116. In this case, the recipient 10 may touch the display window 410 to provide collected information.

Thereafter, when the recipient 10 clicks on the reproduction button 414, the mobile terminal 200 may recognize that the recipient 10 requests the determined optimal place (step 118), and may notify the recipient 10 of the determined optimal place in a visual manner through the display window 410 or in an audible manner through the speaker 420 (step 120). In this case, an image corresponding to the optimal place determined by the mobile terminal 200 may be displayed on the display window 410.

Thereafter, the recipient 10 may click on the selection button 416 to select his/her desired storage position from among the various loading spaces taking into consideration the recommended optimal place displayed on the display window 410. To this end, the various loading spaces including the recommended optimal place may be displayed on the display window 410.

When the recipient 10 selects the storage position, the mobile terminal 200 may recognize the selected storage position as a final storage position (step 122), and may perform steps 124 to 128.

Meanwhile, a computer-readable recording medium includes all kinds of storage devices in which data that may be read by a computer system is stored. Examples of the computer-readable recording medium may include ROM, RAM, a CD-ROM, a magnetic tape, a floppy disk, and an optical data storage device. The computer-readable recording medium may also be distributed over network-coupled computer systems so that the computer-readable code is stored and executed in a distributed fashion. Also, functional programs, code, and code segments for executing the above-described method of managing receipt of a package using a vehicle may be easily construed by programmers skilled in the art to which the present disclosure pertains.

A computer-readable recording medium in which a program for executing the method of managing receipt of a package using a vehicle according to the embodiment may store a program for implementing a function of determining a size of the package when there is a request for delivery of the package, a function of determining an optimal place to store the package in the vehicle using the determined size of the package and the size of the loading space in the vehicle, and a function of providing the optimal place to the recipient 10 and finally determining a package storage position provided by the recipient 10.

Hereinafter, a package receipt method according to a comparative example and the embodiment will be described.

There is a case in which the deliverer 20 is not capable of storing a package in an unmanned package storage facility. For example, many private houses may not be equipped with separate package storage facilities due to high installation cost. Generally, when a recipient who lives in a private house not equipped with a separate package storage facility is absent, a delivery person may place a package in front of a gate or may throw a package over a fence, and may consider that delivery of the package to the recipient has been completed. In this case, however, there is a risk that the package placed in front of a gate is stolen or the package thrown over a fence is damaged. Further, when the weather is not good (e.g. heavy rain or snow), the package may be damaged depending on the packaging condition thereof.

In contrast, according to the embodiment, when the recipient 10 who lives in a private house or a collective residential building, which is not equipped with a separate package storage facility, is absent, the method 100 shown in FIG. 1 is performed, so that a package is stored in a desired position in a vehicle designated by the recipient 10. Accordingly, the recipient 10 may safely receive the package.

In addition, according to the embodiment, a one-time digital key is sent to the deliverer 20, and the deliverer 20 accesses the vehicle using the digital key to safely store the package in a place designated by the recipient 10. Thereafter, when the deliverer 20 performs a behavior corresponding to end of access, for example, closes the frunk, the trunk, the first-row door, or the second-row door of the vehicle, the delivery of the package is deemed complete, and the authority granted to the deliverer 20 is removed, thereby minimizing side effects that may be caused by delivery and receipt of the package according to the embodiment.

In addition, according to the embodiment, when the recipient 10 is absent, a package may be safely delivered without a risk of package theft or package damage attributable to mishandling by a delivery person or outside environment factors like weather.

According to the embodiment, when the recipient 10 who lives in a private house or a collective residential building, which is not equipped with an unmanned package storage facility, is absent, a package may be safely delivered to the recipient. In particular, the embodiment is applicable to many countries in which the majority of people live in private houses, and thus has high industrial applicability.

In addition, according to the embodiment, when the weather around the vehicle is bad (rain, heavy rain, or heavy snow), an optimal place is determined and recommended to the recipient 10 in order to help the recipient 10 determine a storage position (e.g. a tailgate) suitable for the weather, and the recipient 10 sends information about the determined storage position to the deliverer 20. Accordingly, a package may be safely stored in the determined storage position (e.g. a tailgate) in the vehicle without getting wet or damaged by rain or snow. In particular, when opening a tailgate, it is possible to prevent a package from getting wet by rain or snow.

Further, according to the embodiment, in order to help the recipient 10 select an appropriate package storage position from among the loading spaces in the vehicle, the size of a package is compared with the pre-stored sizes of the loading spaces, and an optimal place is determined based on a result of the comparison and is recommended to the recipient 10. Accordingly, the recipient 10 may rapidly select the most appropriate storage position.

As is apparent from the above description, according to the method and apparatus for managing receipt of a package using a vehicle and the computer-readable recording medium for executing the method according to the embodiments, a package may be stored in a desired position in a vehicle designated by a recipient, and thus the recipient may safely receive the package. In addition, after the package is stored in the vehicle, authority granted to a deliverer is removed, thereby minimizing side effects that may be caused by receiving the package using the vehicle. In addition, when the recipient is absent, the package may be safely delivered without a risk of package theft or package damage attributable to mishandling by the deliverer or outside environment factors like weather. In particular, the package may be safely stored in the vehicle without getting wet or damaged by rain or snow. Further, the size of the package may be compared with the pre-stored sizes of loading spaces, and an optimal place may be determined based on a result of the comparison and may be recommended to the recipient, whereby the recipient may rapidly select the most appropriate storage position.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of managing receipt of a package using a vehicle, the method comprising:
   determining, by a size determination controller, a size of the package when there is a request for delivery of the package;
   acquiring, by the vehicle, information about weather around the vehicle;
   determining, by a place determination controller, an optimal place to store the package in the vehicle using the determined size of the package, a size of a loading space in the vehicle, and the information about the weather around the vehicle; and
   displaying, by a display of the vehicle, the optimal place to a recipient,
   wherein a deliverer is provided with instructions, by the display, to store the package in a finally determined package storage position.

2. The method according to claim 1, wherein determining the size of the package includes:
   collecting information related to the size of the package; and
   analyzing the collected information to determine the size of the package.

3. The method according to claim 2, wherein the collected information includes at least one of:
   information about the size of the package included in product information provided by a shopping mall;
   information about the size of the package provided by the deliverer; or
   information about the size of the package directly provided by the recipient.

4. The method according to claim 1, wherein determining the optimal place to store the package includes:
   receiving the size of the loading space that varies depending on a type of the loading space;
   comparing the size of the loading space with the determined size of the package; and
   determining the optimal place using a result of the comparison.

5. The method according to claim 4, wherein the size of the loading space is stored in advance or is provided by the recipient.

6. The method according to claim 1, wherein the information about the weather is acquired from a sensor mounted to the vehicle or is received from outside of the vehicle.

7. The method according to claim 1, further comprising:
   storing the determined optimal place; and
   selecting the stored optimal place and providing the selected optimal place to the recipient.

8. The method according to claim 1, further comprising:
   granting the deliverer authority to access the package storage position; and
   removing the authority when access to the package storage position is completed.

9. The method according to claim 8, wherein the authority includes sending a one-time digital key to the deliverer in response to a request of the recipient or when a condition set by the recipient is satisfied, and
   wherein the deliverer accesses the package storage position using the one-time digital key.

10. The method according to claim 9, wherein removing the authority includes:

determining whether access to a space corresponding to the package storage position using the one-time digital key has been completed; and ending use of the one-time digital key upon determining that access to the space has been completed.

11. The method according to claim 10, wherein access to the space corresponding to the package storage position using the one-time digital key includes at least one of opening of a frunk of the vehicle, opening of a tailgate of the vehicle, opening of a first-row door of the vehicle, or opening of a second-row door of the vehicle.

12. The method according to claim 9, wherein the loading space includes at least one of a frunk, a trunk, a first-row space, or a second-row space of the vehicle.

13. The vehicle configured for use with the method of claim 1.

14. An apparatus for managing receipt of a package using a vehicle, the apparatus comprising:

a size determination controller configured to determine a size of the package in response to a first control signal;

a sensor configured to acquire information about weather around the vehicle;

a place determination controller configured to determine an optimal place to store the package in the vehicle using the determined size of the package, a size of a loading space in the vehicle, and the information about the weather around the vehicle;

a display configured to display the determined optimal place to a recipient in response to a second control signal; and a controller configured to generate the first control signal in response to a request for delivery of the package, wherein a deliverer is provided with instructions to store the package in a finally determined package storage position.

15. The apparatus according to claim 14, wherein the place determination controller includes:

a comparator configured to compare the size of the loading space that varies depending on a type of the loading space with the determined size of the package; and a place analyzer configured to determine the optimal place using a result of the comparison.

16. The apparatus according to claim 15, further comprising a storage configured to store the size of the loading space and the determined optimal place.

17. The apparatus according to claim 14, wherein the controller generates the second control signal in response to a request of the recipient.

18. The vehicle configured for use with the apparatus of claim 14.

19. A non-transitory computer-readable recording medium containing program instructions executed by a processor, the recording medium comprising:

program instructions that determine a size of a package when there is a request for delivery of the package;

program instructions that acquire information about weather around vehicle;

program instructions that determine an optimal place to store the package in a-the vehicle using the determined size of the package, a size of a loading space in the vehicle, and the information about the weather around the vehicle; and program instructions that display the optimal place to a recipient for finally determining a package storage position provided by the recipient.

* * * * *